United States Patent
Rajamani et al.

(10) Patent No.: US 8,424,279 B2
(45) Date of Patent: Apr. 23, 2013

(54) PARTICLE SEPARATOR AND DEBRIS CONTROL SYSTEM

(75) Inventors: Ravi Rajamani, West Hartford, CT (US); Rajendra K. Agrawal, South Windsor, CT (US); Coy Bruce Wood, Ellington, CT (US)

(73) Assignee: United Technologies Corporation, Hartford, CT (US)

( * ) Notice: Subject to any disclaimer, the term of this patent is extended or adjusted under 35 U.S.C. 154(b) by 1538 days.

(21) Appl. No.: 11/729,117

(22) Filed: Mar. 28, 2007

(65) Prior Publication Data

US 2011/0179763 A1  Jul. 28, 2011

(51) Int. Cl.
*F02G 3/00* (2006.01)
*F01D 15/12* (2006.01)

(52) U.S. Cl.
USPC .................................. 60/39.092; 415/122.1

(58) Field of Classification Search ............... 60/39.092, 60/751; 415/121.2, 169.1, 144, 145, 208.3, 415/208.4; 244/53 B
See application file for complete search history.

(56) References Cited

U.S. PATENT DOCUMENTS

| | | | |
|---|---|---|---|
| 619,217 A | 2/1899 | Pieper et al. | |
| 3,421,296 A | 1/1969 | Beurer, Sr. | |
| 3,449,891 A | 6/1969 | Shohet et al. | |
| 3,604,259 A | 9/1971 | Heinsohn et al. | |
| 3,921,906 A * | 11/1975 | Nye et al. | 239/127.3 |
| 3,977,811 A * | 8/1976 | Kuintzle, Jr. | 415/121.2 |
| 3,979,903 A * | 9/1976 | Hull et al. | 60/39.092 |
| 4,304,094 A | 12/1981 | Amelio | |
| 4,509,962 A | 4/1985 | Breitman et al. | |
| 4,528,844 A | 7/1985 | Couch | |
| 4,617,028 A | 10/1986 | Ray et al. | |
| 4,685,942 A | 8/1987 | Klassen et al. | |
| 4,878,805 A * | 11/1989 | Hagshenas | 415/169.1 |
| 4,888,948 A * | 12/1989 | Fisher et al. | 60/223 |
| 4,928,480 A * | 5/1990 | Oliver et al. | 60/39.092 |
| 5,039,317 A | 8/1991 | Thompson et al. | |
| 5,279,109 A | 1/1994 | Liu et al. | |
| 5,558,919 A | 9/1996 | Toni et al. | |
| 5,662,292 A | 9/1997 | Greene et al. | |
| 5,705,930 A | 1/1998 | Forfitt | |
| 6,134,874 A | 10/2000 | Stoten | |
| 6,508,052 B1 * | 1/2003 | Snyder et al. | 60/39.092 |
| 6,702,873 B2 | 3/2004 | Hartman | |
| 2003/0196548 A1 * | 10/2003 | Hartman | 95/8 |
| 2003/1965548 | 10/2003 | Hartman | |
| 2008/0141649 A1 * | 6/2008 | Petrowicz et al. | 60/39.092 |
| 2009/0112519 A1 * | 4/2009 | Novis et al. | 702/183 |

OTHER PUBLICATIONS

Official Search Report and Written Opinion of the European Patent Office in counterpart foreign Application No. 08250938.1, filed Mar. 18, 2008.

* cited by examiner

*Primary Examiner* — Gerald Sung
(74) *Attorney, Agent, or Firm* — Kinney & Lange, P.A.

(57) ABSTRACT

A gas turbine engine system includes an air inlet, an inlet particle separator located at the air inlet and having a blower selectively driven by a variable output motor, and a controller for dynamically controlling the variable output motor that selectively drives the blower of the inlet particle separator.

19 Claims, 3 Drawing Sheets

PARTICLE SEPARATOR AND DEBRIS CONTROL SYSTEM

BACKGROUND OF THE INVENTION

The present invention relates to particle separators and debris control systems for use with gas turbine engines.

Rotorcraft (e.g., helicopters) that use gas turbine engines can operate at a variety of altitudes, and can generally operate at relatively lower altitudes than most fixed-wing aircraft. Low-altitude operation poses operational difficulties for gas turbine engines not always presented at higher altitudes. For instance, landing and taking-off from unpaved areas can "kick up" large amounts of dust and debris. As such, gas turbine engines of rotorcraft operating at low altitudes are often exposed to ambient air that contains a significant amount of debris, typically consisting of large amounts of small, airborne particles or dust. Debris ingested by gas turbine engines is problematic, and can cause erosion and other damage to components of the engine. Such damage can cause engine performance to deteriorate, and can make engine repairs necessary. For example. gas turbine engines contain airfoils having thin edges and tips that are highly sensitive to erosion, and any erosion damage to those areas can significantly impair the efficiency and effectiveness of the airfoil.

Inlet particle separator (IPS) systems are known that provide fine object filtering of ambient air that enters gas turbine engines. The IPS system typically includes a specially designed duct or a ramp-like structure hereinafter referred to as a "ramp" that propels particles radially outward while allowing only relatively clean air to pass through a more radially inward passageway to the interior of the engine. These known IPS systems can include blowers to help move ambient air along the "ramp" to a collector and then expel particles from the engine. Those blowers are mechanically powered by a fixed-gear connection to a gas turbine engine spool. A problem with these systems is that the mechanical power diverted to the IPS system produces a parasitic power loss that negatively impacts fuel burn efficiency of the engine. This is at least partially due to the fact that fixed gearing powers the blower at a constant speed (that is, a speed that is a constant proportion of engine operational speed) whenever the engine is operating, without the capability to turn the blower off while the gas turbine engine is still operating. This is inefficient because in certain situations, such as when the gas turbine engine is operating at relatively high altitudes, the amount of debris in ambient air is generally relatively low. In those situations where the amount of debris is low, operation the IPS system blower provides little or no practical benefit, yet still produces a parasitic power loss. Moreover, the amount of debris in ambient air is dynamically variable across engine operation cycles, but known engine systems do not provide a means to adaptively match debris control system operation to actual ambient air conditions in real time.

BRIEF SUMMARY OF THE INVENTION

A gas turbine engine system includes an air inlet, an inlet particle separator located at the air inlet and having a blower selectively driven by a variable output motor, and a controller for dynamically controlling the variable output motor that selectively drives the blower of the inlet particle separator.

DETAILED DESCRIPTION

In general, the present invention provides a debris control system having a blower that can be powered at selected speed and power settings as a function of the distribution of debris present in ambient air entering a gas turbine engine. The blower can thus be turned "on" or "off" on demand, and, when turned on, operated at speed and power settings that are dynamically matched to desired particle separation performance characteristics in real time. This provides efficient operation of the debris control system with reduced power consumption. As used herein, the term "debris" refers generally to any kind of airborne particulate or foreign object matter present in ambient air that can enter a gas turbine engine.

Figure 1:
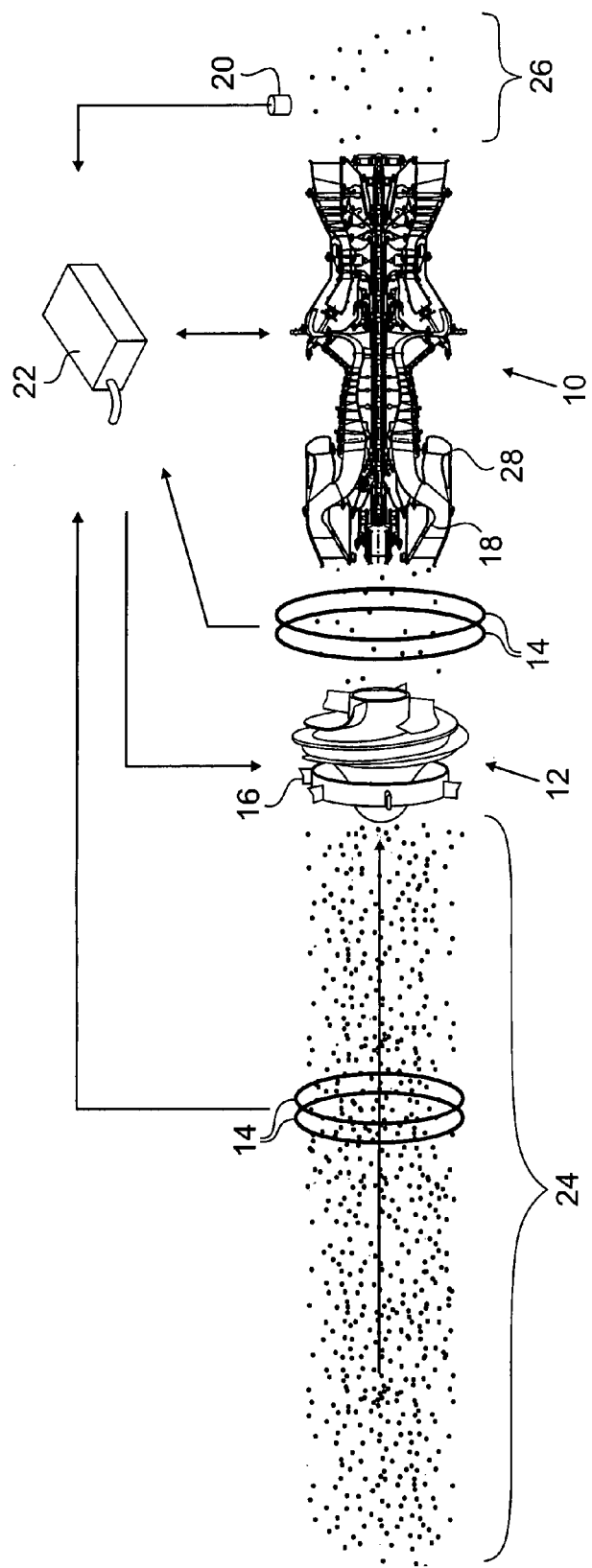
FIG. 1 is an exploded schematic view of a gas turbine engine having a debris control system according to the present invention.

FIG. 1 is an exploded schematic view of a gas turbine engine 10 having a debris control system 12 that includes an inlet debris monitoring system (IDMS) 14, a blower 16, a particle separator "ramp" 18, an exhaust debris monitoring system (EDMS) 20, and a control system 22. As shown in FIG. 1, ambient air 24 containing a relatively large amount of particulate debris enters an inlet of the engine 10, and exhaust gas 26 containing a relatively small amount of particulate debris exits the engine 10. The presence of particulate debris in the ambient air 24 is common when the engine 10 is installed in an aircraft or rotorcraft operating at relatively low altitudes, and the amount of particulate debris present in the ambient air 24 generally decreases when the engine 10 is operating at higher altitudes. It should be recognized that the actual amount of particulate debris present in the ambient air 24 and the exhaust gas 26 will vary according to operating conditions.

The engine 10 is a conventional gas turbine engine suitable for use with an aircraft or rotorcraft. The engine 10 depicted in FIG. 1 is shown by way of example and not limitation. It should be understood that the present invention can be utilized with a gas turbine engine of nearly any configuration.

The IDMS 14 is positioned where the ambient air 24 enters the engine 10, and generates a current that is disturbed as debris passes the IDMS 14. The IDMS 14 can also be present at the point where the debris has been separated from the ambient air 24, i.e. downstream of the blower 16. The magnitude of the disturbance of the current is proportional to the size of the passing debris particles, and the disturbance of the current also indicates the amount of particles in the ambient air 24. The IDMS 14 can include a pair of electrostatic ring sensors available from Smiths Aerospace, London, UK. In FIG. 1, two pairs of electrostatic ring sensors are shown. In alternative embodiments, other types of IDMS sensors can be used and different numbers of sensors can be employed as desired. It should be understood that two pairs of electrostatic ring sensors are not required, and embodiments of the present invention can utilize fewer sensors for the IDMS 14 in order to reduce cost and complexity of the system.

The EDMS 20 is an electrostatic sensor positioned where the exhaust gas 26 leaves the engine 10. The EDMS 20 can include an electrostatic sensor that operates like the IDMS sensor discussed above. However, because there is generally less debris present in the exhaust gas 26 than in the ambient air 24, the EDMS 20 can utilize a relatively small sensor positioned along a periphery of the combustion flowpath rather than a larger ring-shaped sensor that surrounds the flowpath.

The particle separator "ramp" 18 can be a specially designed duct or ramp-like structure having a known configuration with a generally frustoconical shape. The ambient air 24 entering the engine 10 passes along the ramp 18, which directs debris radially outward to a collection assembly 28 that then expels the debris from the engine 10, while "clean" gas from the ambient air 24 can pass to a combustion flowpath of the engine 10. In this sense, the ramp 18 provides a path along which debris can develop momentum in a direction that is different from the combustion flowpath, in order to separate the particulate debris from the gas in the ambient air 24. Typically, the "clean" gas then enters a compressor section of the engine 10.

The blower 16 is positioned adjacent to the ramp 18, and can selectively generate a fluid flow to propel debris from the ramp 18 to the collection assembly 28. The blower 16 can include impeller structures of a known type. As explained in greater detail below, the blower 16 is dynamically powered and can be activated or deactivated independently of the turbine cycle of the engine 10. Moreover, the blower 16 can operate at any selected speed. Operation of the blower 16 is governed by the control system 22.

Figure 2:
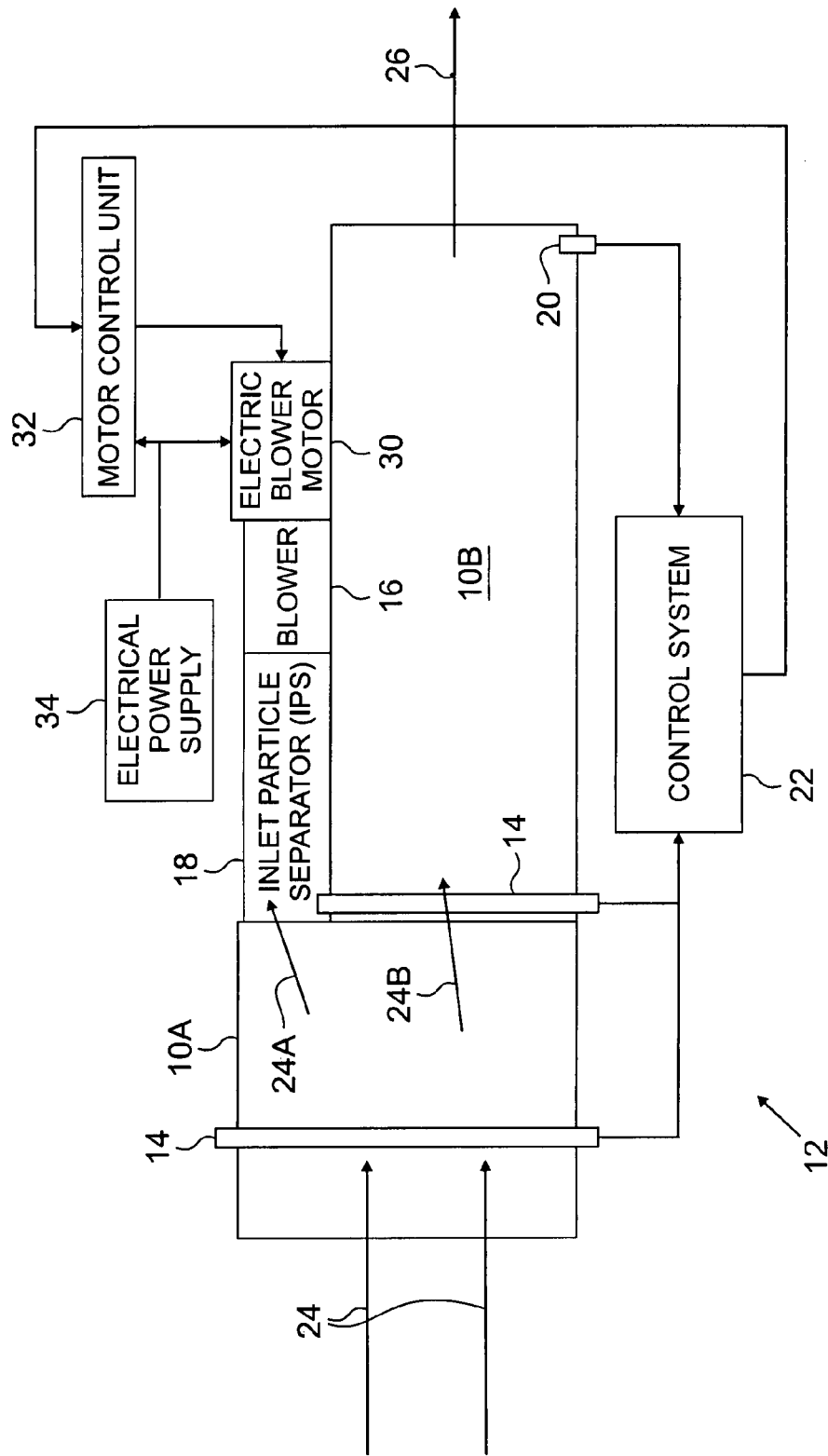
FIG. 2 is a schematic view of the debris control system.

FIG. 2 is a cross-sectional schematic view of the debris control system 12. During engine operation, ambient air 24 enters an engine inlet cowl 10A and passes the IDMS 14. Debris 24A is then directed radially outward along the ramp (or inlet particle separator) 18 to the collection assembly 28 (not shown), while relatively clean air 24B is directed to a combustion flowpath 10B. Alternatively, the IDMS 14 can be positioned in the flowpath of the relatively clean air 24B downstream from the ramp 18. The blower 16 is positioned adjacent to the ramp 18, and is powered by a dynamically adjustable motor 30, such as an electric motor. A motor control unit 32 controls operation of the electric motor 30, and is in turn governed by the control system 22. An electrical power supply 34 provides electrical power to the electric motor 30 and the motor control unit 32. The electrical power supply 34 can be an aircraft engine-powered generator, an engine starter unit, batteries, or other electrical energy source.

During engine operation, the IDMS 14 sends an inlet debris distribution signal to the control system 22, which can be integrated into an electronic engine controller or can be stand-alone control circuitry. The EDMS 20 also sends an exhaust debris distribution signal to the control system 22. The inlet and exhaust debris distribution signals provide the control system 22 with information regarding the particle size and particle count of debris relative to the IDMS 14 and the EDMS 20. As a function of the debris distribution signals, the control system 22 sends an actuator command to the motor control unit 32, which in turn commands appropriate operation of the electric motor 30 and the blower 16. In this way, the debris control system 12 can adaptively match blower 16 operation to actual conditions of the ambient air 24 in real time. The electric motor 30 can be powered on when needed, at a dynamically selected speed and power, and powered off when operation of the blower 16 would provide little or no debris control benefit.

Figure 3:
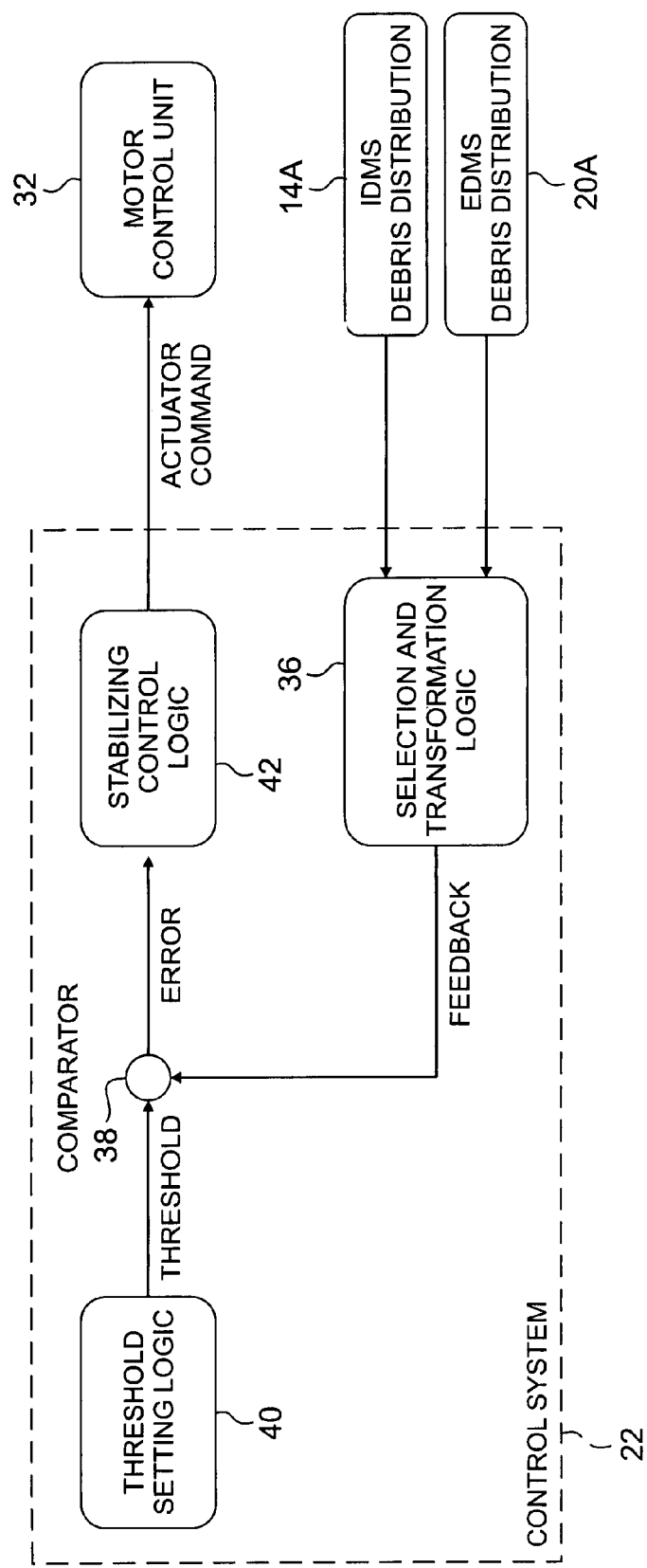
FIG. 3 is a block diagram of a control algorithm for the debris control system.

FIG. 3 is a block diagram of an exemplary control algorithm for the debris control system 12. IDMS debris distribution signals 14A and EDMS debris distribution signals 14B are sent to selection and transformation logic 36 of the control system 22. In addition, threshold setting logic 40 of the control system 22 sends a threshold signal to the comparator 38. The selection and transformation logic 36 identifies relevant data from the debris distribution signals 14A and 14B, reduces electrical noise, and sends a filtered feedback signal to a comparator 38 of the control system 22. The selection and transformation logic 36 is capable of generating a feedback signal appropriate for the position of the IDMS 14 and EDMS 20 in a given embodiment. For example, if the IDMS 14 is positioned before the ramp 18, the selection and transformation logic 36 will generate a feedback signal that estimates the amount of debris (e.g., sand) in the cleaned air 24B based on the IDMS debris distribution signal 14A, the speed of the blower 16 and an estimate of flow of the ambient air 24. If the IDMS 14 is positioned after the ramp 18, then the selection and transformation logic 36 will produce a filtered version of the feedback signal that can be compared directly with the threshold signal. It is anticipated that the IDMS 14 can have different configurations within the engine 10 because in certain installations, it may not be possible to attach the IDMS 14 to a duct behind the ramp 18. The threshold signal can be fixedly established as a function of desired debris distribution parameters for a given engine and operating conditions, or can be dynamically adjusted based on user (e.g., pilot) input or control system 22 calculation based on additional data. The comparator 38 performs a comparison between the selected feedback signal and the threshold signal and produces an error signal output sent to stabilizing control logic 42 of the control system 22. The stabilizing control logic 42 generates an actuator command as a function of the error signal, and sends the actuator command to the motor control unit 32.

The control algorithm shown in FIG. 3 allows the actuator command sent to the motor control unit 32 to operate the electric motor 30 at selected speed and power settings as a function of the distribution of debris in the ambient air 24. When little or no debris is present in the ambient air 24, such as when the engine 10 is operating at high altitudes, the electric motor 30 can be turned off. Under other operational conditions, such as when the engine 10 is operating at low altitudes where significant amounts of debris are present in the ambient air 24, the electric motor 30 can be operated at speed and power settings that are dynamically matched to desired particle separation performance characteristics in real time. The present invention thus allows the electric motor 30 and the blower 16 to be powered only as much as necessary to achieve desired particle separation and debris control. This adaptive, on-demand blower operational scheme reduces or eliminates parasitic power loss for the engine 10 due to particle separation, which in turn improves fuel burn efficiency.

Although the present invention has been described with reference to preferred embodiments, workers skilled in the art will recognize that changes can be made in form and detail without departing from the spirit and scope of the invention. For instance, the particular configurations of the blower and ducting of the debris control system of the present invention can vary as desired for particular applications.

What is claimed is:

1. A gas turbine engine system comprising:
   an air inlet;
   an inlet particle separator having a blower located upstream from a collection assembly and configured to propel debris to the collection assembly in a downstream direction, the blower being selectively driven by a variable output motor, wherein the inlet particle separator is located at the air inlet; and
   a controller for dynamically controlling the variable output motor that selectively drives the blower of the inlet particle separator.

2. The system of claim 1 and further comprising:
   an inlet debris monitoring system for sensing debris present at or near the inlet particle separator as a function of debris sensed.

3. The system of claim 2, wherein the inlet debris monitoring system comprises a ring-shaped electrostatic sensor.

4. The system of claim 2, wherein the controller adjusts an output of the blower as a function of the output signal from the inlet debris monitoring system.

5. The system of claim 1 and further comprising:
an exhaust debris monitoring system for sensing debris present at an engine exhaust outlet and transmitting an output signal to the controller as a function of debris sensed.

6. The system of claim 5, wherein the controller adjusts an output of the blower as a function of the output signal from the exhaust debris monitoring system.

7. The system of claim 1, wherein the controller comprises an electronic engine control module.

8. The system of claim 1 and further comprising:
a substantially frustoconical-shaped ramp located adjacent to the inlet particle separator blower for directing particles radially outward and away from a primary air flow path.

9. The system of claim 1, wherein the variable output motor is configured to selectively drive the blower at a speed that falls within a predetermined operating speed range.

10. The system of claim 1, wherein the variable output motor comprises an electric motor.

11. A debris control system for a gas turbine engine, the system comprising:
an air inlet for admitting ambient air into the gas turbine engine;
an inlet debris monitoring system for sensing debris present in the ambient air admitted through the air inlet, wherein the inlet debris monitoring system generates an output signal as a function of debris sensed;
an inlet particle separator located at the air inlet having a blower selectively operable by an electric motor, a ramp located adjacent to the blower for directing particles radially outward from a primary air flow, and a collection assembly, wherein the blower is positioned upstream of the collection assembly and is configured to propel debris from the ramp to the collection assembly in a downstream direction; and
an electronic controller that processes the output signal from the inlet debris monitoring system and drives the electric motor of the blower as a function of the output signal from the inlet debris monitoring system.

12. The system of claim 11 and further comprising:
an engine exhaust outlet; and
an exhaust debris monitoring system for sensing debris present at the engine exhaust outlet and for sending an output signal to the controller as a function of debris sensed, and wherein the controller drives the blower as a function of the output signals from both the exhaust debris monitoring system and the inlet debris monitoring system.

13. The system of claim 11, wherein the inlet debris monitoring system comprises a ring-shaped electrostatic sensor.

14. The system of claim 11, wherein the electric motor is configured to selectively drive the blower at speed that falls within a predetermined operating speed range.

15. A debris control system for a gas turbine engine, the system comprising:
an air inlet for admitting ambient air into the gas turbine engine;
an engine exhaust outlet;
an exhaust debris monitoring system for sensing debris present at the engine exhaust outlet, wherein the exhaust debris monitoring system generates an output signal as a function of debris sensed;
an inlet particle separator located at the air inlet having a blower selectively operable by an electric motor, a ramp located adjacent to the blower for directing particles radially outward from a primary air flow, and a collection assembly, wherein the blower is positioned upstream of the collection assembly and is configured to propel debris from the ramp to the collection assembly in a downstream direction; and
an electronic controller that processes the output signal from the exhaust debris monitoring system and drives the electric motor of the blower as a function of the output signal from the exhaust debris monitoring system.

16. The system of claim 15 and further comprising:
an inlet debris monitoring system for sensing debris present at or near the inlet particle separator and for sending an output signal to the controller as a function of debris sensed, and wherein the controller drives the blower as a function of the output signals from both the exhaust debris monitoring system and the inlet debris monitoring system.

17. The system of claim 16, wherein the inlet debris monitoring system comprises a ring-shaped electrostatic sensor.

18. The system of claim 15, wherein the electric motor is configured to selectively drive the blower at speed that falls within a predetermined operating speed range.

19. The system of claim 15, wherein the ramp has a substantially frustoconical shape.

* * * * *